United States Patent [19]

Blaiklock et al.

[11] 4,177,538
[45] Dec. 11, 1979

[54] WINDSHIELD WIPER ELEMENT

[75] Inventors: William M. Blaiklock, Dundas; Brian A. Fisher, Burlington, both of Canada

[73] Assignee: Tridon Limited, Burlington, Canada

[21] Appl. No.: 928,460

[22] Filed: Jul. 27, 1978

[51] Int. Cl.² .............................................. B60S 1/38
[52] U.S. Cl. ............................... 15/250.39; 15/250.42
[58] Field of Search ......................... 15/250.36–250.42

[56] References Cited

U.S. PATENT DOCUMENTS

| 3,104,412 | 9/1963 | Hinder | 15/250.42 |
| 3,885,265 | 5/1975 | Deibel | 15/250.42 |
| 3,919,736 | 11/1975 | Bourassa et al. | 15/250.42 |
| 3,958,295 | 5/1976 | Green et al. | 15/250.39 |
| 4,009,503 | 3/1977 | Sharp | 15/250.42 |

Primary Examiner—Peter Feldman
Attorney, Agent, or Firm—John A. Mitchell; Pasquale A. Razzano

[57] ABSTRACT

A windshield wiper element is disclosed which includes an elongated backing strip having a slot formed therein and a squeegee element having a bulbous head received in the slot. The backing strip has a plurality of breakage indications provided thereon at predetermined spaced locations, corresponding to predetermined windshield wiper lengths, to permit it to be used as a universally applicable windshield member with different sizes of super-structure. The backing strip includes means located between each of the breakage indications for engaging the head of the squeegee in order to resist longitudinal removal of the squeegee from the backing strip.

10 Claims, 7 Drawing Figures

U.S. Patent   Dec. 11, 1979   4,177,538
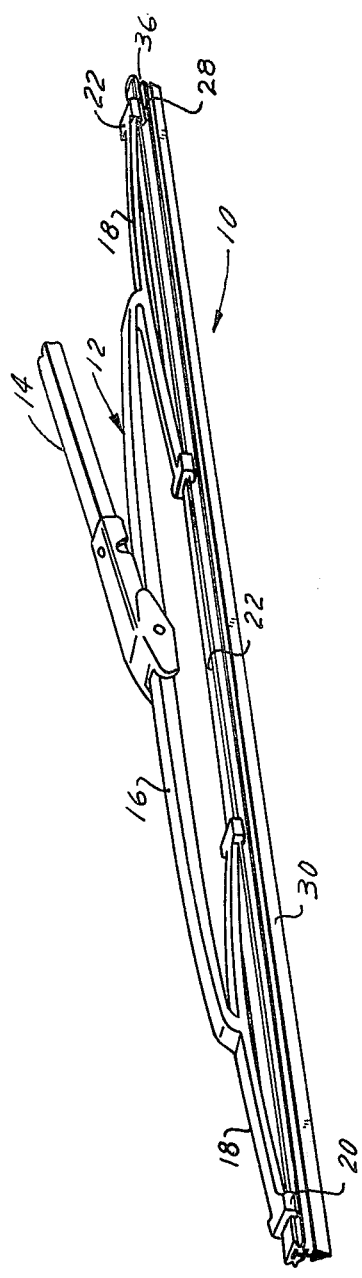
FIG. 1
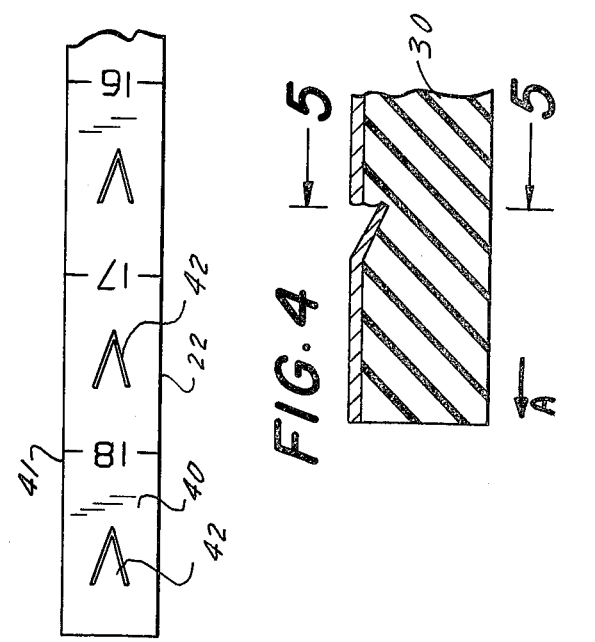
FIG. 3
FIG. 4
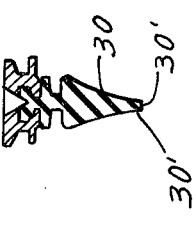
FIG. 5
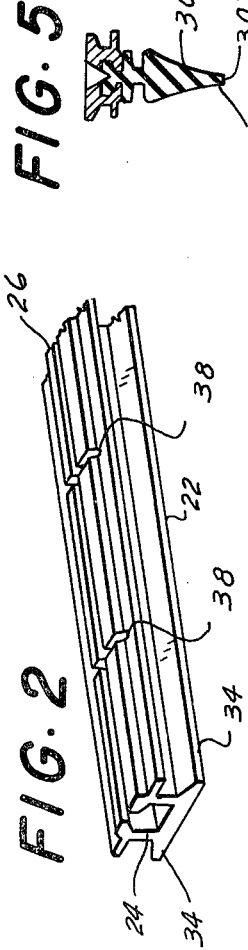
FIG. 7
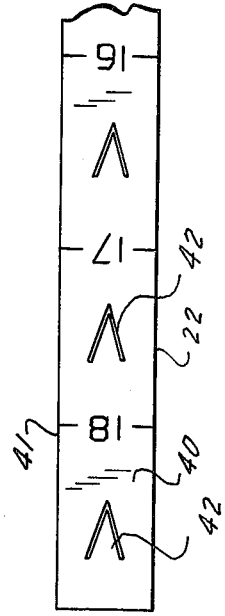
FIG. 2
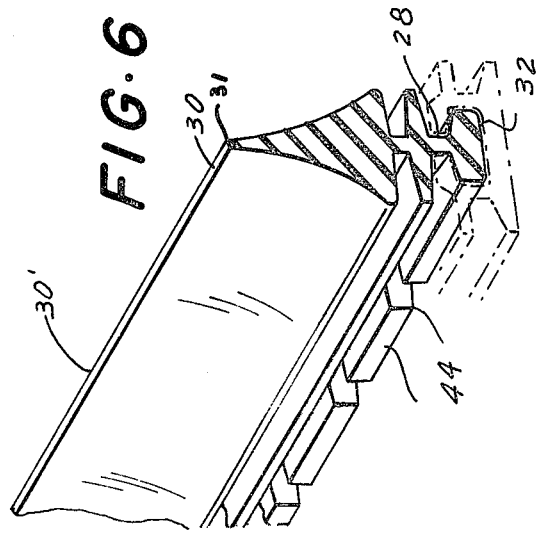
FIG. 6

WINDSHIELD WIPER ELEMENT

The present invention relates to windshield wiper elements, and in particular, to an improved windshield wiper backing strip and squeegee combination.

Present day conventional windshield wiper structures consist generally of an elongated squeegee member support on a backing strip in a superstructure attached to the windshield wiper arm. The squeegee is generally formed of soft rubber or rubber-like material and produces the desired water removing wiping action. It is supported in a backing member that is relatively flexible in directions perpendicular to the windshield surface, so that the squeegee can readily conform to that surface. The backing member is much less flexible in directions parallel to the surface in order to hold the squeegee relatively straight in its longitudinal direction as it moves back and forth over the windshield.

Since the useful life of the windshield wiper arm and associated superstructure is considerably longer than that of the squeegee it is common practice to replace the squeegee from time to time with its backing member as a unitary assembly. Since there are a variety of different lengths of windwhield wiper arms and superstructures generally in use throughout the world, an automotive supplier must stock samples of each size in order to provide full service for his customers. And, since there are more than one make of windshield wiper a comparable stock must be provided for each make.

It has been proposed, as disclosed for example in U.S. Pat. No. 3,958,295, to provide a windshield wiper backing member and squeegee which is universally acceptable in windshield wipers of different sizes. This has been provided by using a backing strip that has breakage indications thereon at predetermined positions corresponding to predetermined windshield wiper lengths. An automotive supplier therefore needs to stock only one standard maximum size of windshield wiper element. When it is desired to replace an existing windshield wiper squeegee, a new element's backing strip is broken at the proper length, at an appropriate breakage indication, and the squeegee element is cut to provide a squeegee and backing assembly of the desired length.

With the windshield wiper element described in the above noted patent it is necessary that the backing strip be deformed at one end in order to prevent removal of the squeegee element through that end of the backing strip and that a removable stop clip be provided at the opposite end of the backing element. The deformation and the removable clip serve to hold the backing strip on the superstructure assembly, i.e. they prevent inadvertent longitudinal removal of the backing strip from the superstructure. This arrangement causes an increased expense in the manufacturing procedure, due to the manufacture and packaging of these separated parts. Furthermore, assembly of the backing strip, squeegee and clip into the wiper structure is difficult and awkard due to the small size of the clip and the need to assemble the squeegee and backing strip into the superstructure before assembling the clip.

Undesired longitudinal movement of the backing strip and squeegee assembly can also be a problem with the windshield wiper element of the above noted patent. That is, the backing strip is free to move longitudinally, i.e. back and forth in the claws of the superstructure within the confines defined by the deformed end of the backing strip at one end and the clip at the other end. Since wiper structures of a nominal length may vary in actual length from manufacturer to manufacturer the spacing of the backing strip deformed end and clip must be selected to fit the longest available superstructure of each nominal size. As a result, for shorter superstructures of the same nominal size the wiper element will be too long and will produce longitudinal play that will materially affect its working ability.

It is an object of the present invention to provide a new windshield wiper backing member which is usable with wipers of different lengths, and which can be secured to the wiper superstructure by a clip member at only one end thereof.

Another object of the present invention is to provide a windshield wiper backing member which can be used with and secured to a windshield wiper superstructure of different lengths with a clip at one end to allow the other end thereof to be sufficiently long to compensate for variations in superstructure lengths while at the same time restrain the backing member without objectionable longitudinal movement.

Another object of the present invention is to provide a windshield wiper backing element which can be universally adjusted in size, and in which the squeegee element is restrained against inadvertent longitudinal removal or curling.

Another object of the present invention is to provide an improved winshield wiper backing member that can be used with different types of superstructures.

A still further object of the present invention is to provide a windshield wiper backing element which is relatively simple to manufacture and durable in use.

Another object of the present invention is to provide a windshield wiper backing element which is relatively inexpensive to manufacture.

A still further object of the present invention is to provide a backing element which is universally adjustable in length and which can be locked into the superstructure of a windshield wiper assembly without the need to use additional clips, locks or other fastening devices after insertion of the backing element into the superstructure.

In accordance with an aspect of the present invention a windshield wiper element is provided that includes a backing member formed of an extruded plastic relatively rigid yet flexible material. The backing strip supports a squeegee whose length can be reduced. The squeegee has an elongated configuration and includes a bulbous elongated head strip that is received in a longitudinal slot in the backing member. The backing member is provided at predetermined positions along its length with breakage indications which permit shortening of the backing member to a corresponding required windshield wiper length. Means are also provided on the backing strip between each of the breakage indications for engaging the bulbous head strip of the squeegee element in order to resist longitudinal removal of the squeegee from the backing strip in at least one direction therein. In this way the squeegee is held in a relatively fixed position in the backing strip without the aid of a deformation at the end of the backing strip as required in previously proposed structures. An end clip is provided on one end of the backing strip in order to attach the backing strip to a windshield wiper superstructure. The end clip blocks removal of the squeegee from the backing strip through the end on which it is mounted and the means in the backing strip for resisting removal of the squeegee are designed to resist such removal through at least the opposite end of the backing element.

The above, and other objects, features and advantages of this invention will be apparent in the following detailed description of an illustrative embodiment thereof, which is to be read in connection with the accompanying drawings, wherein:

FIG. 1 is a perspective view of a windshield wiper superstructure containing a backing strip and squeegee element constructed in accordance with the present invention;

FIG. 2 is an inverted partial perspective view of the backing strip of the windshield wiper element of the present invention;

FIG. 3 is a top plan view of the backing strip shown in FIG. 2;

FIG. 4 is a partial longitudinal sectional view of the backing strip and windshield wiper and squeegee combination of the present invention;

FIG. 5 is a sectional view taken along line 5—5 of FIG. 4;

FIG. 6 is a partial perspective view of a squeegee element constructed in accordance with another embodiment of the present invention; and FIG. 7 is a longitudinal sectional view similar to FIG. 4 of another embodiment of the invention using the squeegee element of FIG. 6.

Referring now to the drawings in detail, and initially to FIG. 1 thereof, a windshield wiper element 10, constructed in accordance with the present invention, is illustrated mounted in a conventional superstructure 12 secured to the oscillating arm 14 of a windshield wiper automotive assembly. The superstructure illustrated in FIG. 1 is of conventional construction and includes a main yoke member 16 which is connected at its ends approximately to the center points to secondary yokes 18. The end of each of the secondary yokes is provided with a pair of claw members 20 of conventional construction which embrace the backing member 22 of windshield wiper element 10. The superstructure 12 shown in the drawing is for illustrative purposes only, and it is to be understood that the backing element 10 of the present invention may be used with the various different types of conventionally formed superstructures presently available on the market substantially all of which include longitudinally spaced embracing pairs of claws similar to the claws 20 illustrated in FIG. 1.

Backing element 22 is illustrated in greater detail in FIG. 2. This backing member is preferably formed by an extrusion operation from a suitable plastic material having the necessary properties of strength, resilience and weather resistance. The backing strip has a longitudinal channel 24 formed therein in a conventional manner, opening to the lower face of the backing member. The mouth of the channel 26 is of smaller width than the remainder of the channel in order to provide a slot for retaining reception therein of the waist portion 28 of the squeegee element 30. The bulbous head portion or strip 32 of the squeegee is retained in the channel 24 itself.

The backing strip is also provided with at least one pair of laterally extending flanges 34, which are received within the claws 20 of the wiper structure. In the illustrative embodiment two parallely extending spaced flanges 34 are provided.

With the arrangement of the present invention the backing strip can be slid longitudinally through the superstructure claws 20 which restrain the backing strip against lateral movement in the superstructure. Longitudinal movement of the backing member is prevented by a conventional clip structure 36 secured to one end of the backing strip. The clip structure can either be removably mounted or fixed to the backing element 22 and has a hook member 28 which snaps about one of the claws 20. In this manner the backing strip is removably held against longitudinal movement in the superstructure element.

In order to provide the universally acceptance feature of the present invention backing strip 22 is provided with breakage indications including transverse slots 38 formed therein at predetermined spaced locations measured from the end or the backing strip to which the clip 36 is secured. In addition to the slots 38, the top surface 40 of the backing strip 22 includes printed indicia 41 representing the number of inches or millimeters each of the slots 38 is located from the end of the backing strip containing clip 36. Thus, as illustrated in FIG. 3, three indicia representing the numerals 16", 17" and 18", are provided in association with three of the slots 38. Of course more slots and additional indicia can be provided at other lengths. And a stake is provided beyond the last indicia (18" in FIG. 3) in case no cut is required in the backing strip and inside of the smallest dimension indicia on the backing strip in the event it must be cut down to that smallest dimension.

In the operation of this type of backing strip, when it is required to replace an existing squeegee and backing strip combination, a refill according to the present invention is utilized having the longest length required in conventional windshield wiper assemblies. If the length of the backing member and squeegee combination is too long for the superstructure in which it is to be placed then the purchaser simply breaks the backing member at the appropriate break indication, by bending the backing member at the slot represented by the appropriate length indicia on the top surface of the backing strip. He then cuts the squeegee to the proper length corresponding to the length of the backing strip at the break point.

Squeegee 30 is held in position in the backing strip against longitudinal movement by a plurality of stakes or tabs 42 formed in the backing strip. In the embodiment of the invention illustrated in FIG. 3 these stakes or tabs are generally triangular in configuration and are depressed downwardly into the squeegee 30, as illustrated in FIG. 4. However it is contemplated that stakes of other configurations can also be used. The apices of these tabs penetrate the squeegee and thus resist longitudinal movement of the squeegee in the backing strip. The apices of the tabs 42 are directed towards the end of the backing element on which clip 36 is mounted so that the tabs resist movement of the squeegee 30 in the direction of the arrow A in FIG. 4, i.e. away from clip 36, while the clip resists movement of the squeegee in the opposite direction. Of course, since the tabs penetrate the squeegee they will also provide some resistance to movement in the direction toward clip 36. As a result of this construction no end plug for the backing strip and no deformation of the backing strip is required in order to prevent longitudinal movement of the squeegee away from clip 36. And, since a stake is provided between at least each indicia 42, the squeegee will be retained in the backing strip regardless of the length to which it is cut.

It has been found desirable to permit limited amount of longitudinal and vertical movement of the squeegee in the backing element in order to assist in the correct orientation of the squeegee wiping lips 31 as the wiper changes direction on the glass at the end of the wiping stroke. To this end, a modification of the invention is illustrated in FIGS. 6 and 7. In this form of the invention the squeegee 30 is provided with transverse slots or recesses 44 in its bulbous head blank. Each of these slots or recesses is located to be positioned between a pair of breakage indications on the backing strip 22. Thus, as illustrated in FIG. 7, with this embodiment of the invention the stakes or tabs 42 are simply received in the recesses 44 of the squeegee 30. Thus slight movement of the squeegee in the direction of the arrows A, B, i.e. in the longitudinal direction is permitted, but longitudinal removal of the squeegee from the backing strip is resisted by the stakes or tabs 42, since the tabs will abut against the ends 46 of the slots 44, upon a limited amount of movement of the squeegee, and thus prevent the removal of the squeegee from the backing strip.

Accordingly it is seen that by this structure of the invention a universally acceptable backing strip is provided which permits the purchaser to select the proper size and break the backing strip to the desired dimension when purchased. In addition, the strip is less expensive to manufacture than previously proposed structures since one less clip is required and no deformation of the backing strip is necessary. And, the assembly of the backing strip into the superstructure is quite simple, since the backing strip can simply be slid longitudinally into the superstructure until the clip 36 snaps into position. Moreover, limited movement of the squeegee is permitted, particularly with the construction of the invention illustrated in FIGS. 6 and 7, to insure proper wiping action.

Although an illustrative embodiment of the invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A windshield wiper element comprising a backing member, a squeegee whose length can be reduced by severing thereof retained and supported by the backing member; said squeegee having an elongated configuration including an elongated head strip; said backing member consisting of an elongated body of generally uniform cross-section along its length having an elongated longitudinally extending channel formed therein receiving said head strip of the squeegee and at least one pair of oppositely extending elongated flanges adapted to be received in the claws of a windshield wiper superstructure; said backing member being provided at predetermined positions along its length with breakage indications for shortening of the backing member to a corresponding required length, and means on said backing strip located at least between each of said breakage indications for engaging and penetrating said head strip of the squeegee to resist longitudinal removal of the squeegee from the backing strip; said means comprising a plurality of integral tabs formed in said backing strip and respectively located between each of said indications and depressed into said channel for engagement within said head strip.

2. A windshield wiper element as defined in claim 1 wherein said means comprises at least one integral tab formed in said backing strip between each of said indications depressed into said channel for engagement with said bulbous head strip.

3. A windshield wiper element as defined in claim 1 wherein said head strip has upwardly opening transverse slots formed therein respectively associated with and receiving said tabs which project downwardly from the backing member into the slots.

4. A windshield wiper element as defined in claims 1 or 3 including an end clip secured to one end of said backing strip for releasably securing the wiper element to a windshield wiper superstructure.

5. A windshield wiper element as defined in claim 4 wherein said indications are located adjacent one end of said backing strip and said clip is located adjacent the other end of the backing strip.

6. A windshield wiper element as defined in claim 5 wherein said indications include transverse slots cut in said backing strip on the side thereof adjacent said squeegee in predetermined spaced locations.

7. A windshield wiper element as defined in claim 6 wherein said indications include printed indicia associated with each of said slots representing the length of the backing strip from said other end thereof to the respective indicia.

8. A windshield wiper element comprising an elongated backing strip having a slot formed therein and a squeegee element having a head received in said slot, said backing strip having a plurality of breakage indications provided thereon at predetermined spaced locations corresponding to predetermined windshield wiper lengths and means on the backing strip located at least between each of said breakage indications for engaging said head strip of the squeegee to resist longitudinal removal of the squeegee from the backing strip; said means comprising a plurality of integral tabs formed in said backing strip and respectively located between each of said indications and depressed into said channel for engagement with said head strip.

9. A windshield wiper element as defined in claim 8 wherein said head strip has upwardly opening transverse slots formed therein respectively associated with and receiving said tabs which project downwardly from the backing member into the slots.

10. A windshield wiper element as defined in claims 8 or 9 including an end clip secured to one end of said backing strip for releasably securing the wiper element to a windshield wiper superstructure.

* * * * *